United States Patent
Cheng et al.

(10) Patent No.: US 11,599,840 B2
(45) Date of Patent: Mar. 7, 2023

(54) SYSTEM FOR DISCOVERING HIDDEN CORRELATION RELATIONSHIPS FOR RISK ANALYSIS USING GRAPH-BASED MACHINE LEARNING

(71) Applicant: Graphen, Inc., New York, NY (US)

(72) Inventors: Lishui Cheng, Baldwin Place, NY (US); Ching-Yung Lin, Scarsdale, NY (US); Jie Lu, Briarcliff Manor, NY (US); Danny Lo-Tien Yeh, Tarrytown, NY (US)

(73) Assignee: Graphen, Inc., New York, NY (US)

( * ) Notice: Subject to any disclaimer, the term of this patent is extended or adjusted under 35 U.S.C. 154(b) by 0 days.

(21) Appl. No.: 16/285,157

(22) Filed: Feb. 25, 2019

(65) Prior Publication Data
US 2019/0266528 A1 Aug. 29, 2019

Related U.S. Application Data

(60) Provisional application No. 62/634,883, filed on Feb. 25, 2018.

(51) Int. Cl.
| | |
|---|---|
| *G06Q 10/00* | (2012.01) |
| *G06Q 10/0635* | (2023.01) |
| *G06N 20/00* | (2019.01) |
| *G06T 11/20* | (2006.01) |

(52) U.S. Cl.
CPC ......... *G06Q 10/0635* (2013.01); *G06N 20/00* (2019.01); *G06T 11/206* (2013.01)

(58) Field of Classification Search
None
See application file for complete search history.

(56) References Cited

U.S. PATENT DOCUMENTS

| | | | |
|---|---|---|---|
| 7,512,612 B1 | 3/2009 | Akella et al. | |
| 10,127,511 B1* | 11/2018 | Epstein | G06Q 30/018 |
| 10,210,470 B2* | 2/2019 | Datta Ray | H04L 63/1408 |
| 2005/0222929 A1* | 10/2005 | Steier | G06Q 40/00 |
| | | | 705/35 |
| 2006/0167784 A1* | 7/2006 | Hoffberg | G06Q 20/401 |
| | | | 705/37 |

(Continued)

OTHER PUBLICATIONS

Hamilton, William L., Rex Ying, and Jure Leskovec. "Representation learning on graphs: Methods and applications." arXiv preprint arXiv: 1709.05584 (2017). (Year: 2017).*

(Continued)

*Primary Examiner* — Gurkanwaljit Singh
(74) *Attorney, Agent, or Firm* — Akerman LLP; Ryan L. Harding

(57) ABSTRACT

A system, method, and computer readable device that detects hidden correlation relationships among entities, such as companies and/or individuals is presented. A dataset that corresponds to a predefined set of correlation relationships of these companies and/or individuals may be collected. The dataset may be stored in a graph database and a machine learning system may be built using features computed from the graph database. At least a new pair of companies or a new pair of an individual and a company may be evaluated. The system, method, and/or computer readable device may determine whether a hidden correlation relationship exists between them.

20 Claims, 16 Drawing Sheets

Three steps to develop a solution to hidden relationship discovery:
✓ Convert it to a machine learning problem,
✓ Create training data set from existing data/graph database,
✓ Conduct feature engineering.

(56) References Cited

U.S. PATENT DOCUMENTS

| | | | |
|---|---|---|---|
| 2007/0087756 A1* | 4/2007 | Hoffberg | G06Q 20/065 |
| | | | 455/450 |
| 2010/0317420 A1* | 12/2010 | Hoffberg | G06Q 30/0282 |
| | | | 463/1 |
| 2011/0208681 A1 | 8/2011 | Kuecuekyan | |
| 2015/0310195 A1 | 10/2015 | Bailor et al. | |
| 2016/0078356 A1 | 3/2016 | Dang et al. | |
| 2017/0220964 A1* | 8/2017 | Datta Ray | G06Q 10/0635 |
| 2018/0197128 A1* | 7/2018 | Carstens | G06F 40/205 |
| 2020/0226512 A1* | 7/2020 | Epstein | G06Q 30/02 |

OTHER PUBLICATIONS

Feng, Nan, Harry Jiannan Wang, and Minqiang Li. "A security risk analysis model for information systems: Causal relationships of risk factors and vulnerability propagation analysis." Information sciences 256 (2014): 57-73. (Year: 2014).*

Galindo, Jorge, and Pablo Tamayo. "Credit risk assessment using statistical and machine learning: basic methodology and risk modeling applications." Computational Economics 15.1 (2000): 107-143. (Year: 2000).*

Kose, Ilker, Mehmet Gokturk, and Kemal Kilic. "An interactive machine-learning-based electronic fraud and abuse detection system in healthcare insurance." Applied Soft Computing 36 (2015): 283-299. (Year: 2015).*

Phua, Clifton, et al. "A comprehensive survey of data mining-based fraud detection research." arXiv preprint arXiv:1009.6119 (2010). (Year: 2010).*

Prado, Adriana, et al. "Mining graph topological patterns: Finding covariations among vertex descriptors." IEEE Transactions on Knowledge and Data Engineering 25.9 (2012): 2090-2104. (Year: 2012) (Year: 2012).*

Ren, Xuguang, and Junhu Wang. "Exploiting vertex relationships in speeding up subgraph isomorphism over large graphs." Proceedings of the VLDB Endowment 8.5 (2015): 617-628. (Year: 2015) (Year: 2015).*

Budur et al., "Structural analysis of criminal network and predicting hidden links using machine learning," In: arXiv preprint arXiv, Sep. 21, 2015, https://arxiv.org/pd1/1507.05739.pdf.

Leskovec et al., "Learning to discover social circles in ego networks," In: Advances in neural information processing systems, 2012, https://cs.stanford.edu/people/jure/pubs/circles-nips12.pdf.

World Intellectual Property Organization, "International Search Report and Written Opinion," issued in PCT/US2019/019466, dated May 13, 2019.

Liben-Nowell et al., "The link-prediction problem for social networks," J Am. Soc. Inf. Sci., 58: 1019-1031, May 2007.

Wilson et al., "Graph-based Proximity Measure", Book Chapter 6 from Practical Graph Mining with R, CRC Press, 2013.

* cited by examiner

Question: is there a (hidden) shareholder relationship between Alice and Company A?
This may be important for loan risk analysis.

What does the graph look like when they have a shareholder relationship?
Measure the closeness between two vertexes

- Start w/each pair of vertexes
- E.g., John and Company A
- Remove the shareholder edge : provide label for class "1"
- Generate a reduced graph
- Compute features for the pair {John, Company A}

Similar processing for John and B, Alice and B, Alice and C

- John and Company C
- No shareholder relationship: provide label for class "0"
- Compute features on the original graph for the pair {John, Company C}

Similar processing for A and B, B and C, A and C

- Graphs from previous figures can be further reduced based on
  ✓ Correlation relationship
  ✓ Property
  ✓ etc.

Collateral relationship only

- For each vertex, we can compute these kinds of subgraphs, e.g.,
  - ✓ (Strongly) connected components (SCC)
  - ✓ Cycles
  - ✓ Ego net with or without depending on specifying certain correlation relationship or property

- Take the union of one of above subgraphs or a combination of them for each pair of vertexes to generate a new graph

FIG. 9

- Shortest distance
- Common neighbors
- Jacard's coefficient
- Resource allocation coefficient
- Adamic/Adar index
- Preferential attachment index
- Katz
- Rooted PageRank
- SimRank
- Salton index
- Sorensen index
- Hub Index
- Hitting time, commute time
- use weight, direction

1200

Property
   --- Names
   --- Address
   --- Emails
   --- etc.

FIG. 12

Question: is there a (hidden) shareholder relationship between Alice and Company A?

SYSTEM FOR DISCOVERING HIDDEN CORRELATION RELATIONSHIPS FOR RISK ANALYSIS USING GRAPH-BASED MACHINE LEARNING

CROSS REFERENCE TO RELATED APPLICATIONS

This application claims priority to and claims the benefit of U.S. Provisional Patent Application No. 62/634,883, filed on Feb. 25, 2018, which is hereby incorporated by reference in its entirety.

FIELD OF THE INVENTION

The present application relates to artificial intelligence technologies, machine learning technologies, relationship detection technologies, risk analysis technologies, and computing technologies, and more particularly, to a system and method for discovering hidden correlation relationships for risk analysis using graph-based machine learning.

BACKGROUND

In today's society, entities, such as businesses, have an increasing need to properly assess the risks affecting their businesses. Risks, if not effectively detected, avoided or dealt with, may adversely affect a business's profits, reputation, and client base. As an example, banks have tens of thousands of companies and individual clients as their borrowers for various bank products, such as loans. When a company client applies for a loan, the risk and underwriting departments of a bank typically needs to consider this company's correlation relationships with other clients in addition to evaluating the company's individual credentials so that the bank can have a comprehensive picture of the credit and financial conditions of the company client. Notably, there are many correlation relationships among companies and individual clients. For example, correlation relationships include, but are not limited to, stock holding correlation relationships, guarantee correlation relationships, collateral correlation relationships, trading correlation relationships, other types of correlation relationships, or a combination thereof. A complete and accurate characterization of these correlation relationships among clients can improve the bank's understanding of risks involved with the clients' loans. However, in practice, it is very common that a hidden correlation relationship exits. For example, an individual may hide his actual control over several companies and may use someone else to act as his cover-up in some of these companies for financing or tax purposes. Therefore, two companies that are applying for loans may appear to be independent entities, but, in fact, they belong to the same corporate entity or the same actual owner. These circumstances are not unusual, especially in countries where government and banking regulations are insufficient. This poses a major risk for banks. As a result, it would be desirable for banks and other entities to have a way to reveal these hidden correlation relationships. Traditionally, banks have resorted to methods, such as conducting client visits and investigation as part of due diligence or performing correlation-relationship finding from a database based on some pre-defined rules. Nevertheless, such techniques are not effective enough in detecting such hidden correlation relationships and mitigating risk. As a result, current technologies and processes may be modified and improved so as to provide enhanced functionality and features for entities, users, or both. Such enhancements and improvements may provide for improved quality of service, improved interactions between entities and users, increased efficiencies, increased access to meaningful data, and substantially-improved decision-making abilities for entities, particularly when hidden correlation relationships are effectively discovered before negative impacts are felt by the entities.

SUMMARY

A system and accompanying methods for discovering hidden correlation relationships for risk analysis using graph-based machine learning are disclosed. In particular, the system and accompanying methods utilize machine learning to detect hidden correlation relationships based on the knowledge learned from the data of a number of clients, which are stored using graph database. In certain embodiments, the system and methods provide a graph and machine learning-based solution for entities, such as banks, to discover hidden correlation relationships among companies and individuals. A dataset may be collected that consists of information about tens of thousands of clients that includes, but is not limited to, credit histories, financial information, trading and economic information, shareholder information, and transactional information. The data source for the dataset may include, but is not limited to, the bank's own records including information provided through the loan application, government agencies, news media and social networks, the company's own public announcements, or a combination thereof. Correlation relationships may be extracted, and a graph may be created with the correlation relationships and other information about the clients. The vertex of the graph may be a company, an individual, or any type of entity. The edge may represent a certain kind of correlation relationship. The edge may be directional or unidirectional and it may also have a weight. On certain occasions, there could be one or multiple edges between two vertexes indicating one or multiple correlation relationships. From the graph database, a set of features may be computed that is indicative of the proximity of two vertexes. The closer the two vertexes are, the more likely that they may have a certain correlation relationship. Training data may be created from the data available at the graph database. A machine learning system may be built using the training data and may predict the probability of a hidden correlation relationship between pairs of nodes from the graph, i.e., companies and individuals. In certain embodiments, the hidden correlation relationship discovery may be achieved through supervised classification. The description provided in this disclosure focuses on finding hidden relationship between two vertexes, but similar methods can be used to find hidden relationships among a group of multiple vertexes. For example, the method presented in this disclosure can be iteratively run for each pair of the nodes in the group.

To that end, in one embodiment according to the present disclosure, a system for discovering hidden correlation relationships for risk analysis using graph-based machine learning is disclosed. The system may include a memory that stores instructions and a processor that executes the instructions to perform operations conducted by the system. The system may perform an operation that includes collecting data associated with known correlation relationships that exist among a plurality of entities, wherein the data comprises information associated with the known correlation relationships and an indication of a strength of the known correlation relationships. The system may then perform an operation that includes generating a graph based on the known correlation relationships and the strength of the known correlation relationships, wherein vertexes of the graph correspond to the plurality of entities and edges of the graph correspond to the known correlation relationships. The system may proceed to perform an operation that includes computing, based on the graph, a set of features and corresponding labels for the plurality of entities. Once the set of features for the plurality of entities is computed, the system may perform an operation that includes training a machine learning model using the computed set of features and the corresponding labels. The system may then perform an operation that includes determining a hidden correlation relationship for at least one pair of the plurality of entities by utilizing machine learning model trained with the computed set of features.

In another embodiment, a method for discovering hidden correlation relationships for risk analysis using graph-based machine learning is disclosed. The method may include utilizing a memory that stores instructions, and a processor that executes the instructions to perform the various functions of the method. The method may include accessing data associated with known correlation relationships that exist among a plurality of entities, wherein the data comprises information associated with the known correlation relationships and an indication of a strength of the known correlation relationships. Additionally, the method may include generating a graph based on the known correlation relationships and the strength of the known correlation relationships, wherein vertexes of the graph correspond to the plurality of entities and edges of the graph correspond to the known correlation relationships. The method may also include computing, based on the graph, a set of features and corresponding labels for the plurality of entities. Furthermore, the method may include training a machine learning model using the computed set of features and the corresponding labels. Moreover, the method may include determining a hidden correlation relationship for at least one pair of the plurality of entities by utilizing machine learning model trained with the computed set of features.

According to yet another embodiment, a computer-readable device having instructions for discovering hidden correlation relationships for risk analysis using graph-based machine learning is provided. The computer instructions, which when loaded and executed by a processor, may cause the processor to perform operations including: receiving data associated with known correlation relationships that exist among a plurality of entities, wherein the data comprises information associated with the known correlation relationships and an indication of a strength of the known correlation relationships; generating a graph based on the known correlation relationships and the strength of the known correlation relationships, wherein vertexes of the graph correspond to the plurality of entities and edges of the graph correspond to the known correlation relationships; computing, based on the graph, a set of features and corresponding labels for the plurality of entities; training a machine learning model using the computed set of features and the corresponding labels; and determining a hidden correlation relationship for at least one pair of the plurality of entities by utilizing machine learning model trained with the computed set of features.

These and other features of the systems and methods for discovering hidden correlation relationships for risk analysis using graph-based machine learning are described in the following detailed description, drawings, and appended claims.

BRIEF DESCRIPTION OF THE DRAWINGS

FIG. 9 is a diagram illustrating additional examples of a transformed graph.

Figure 12:
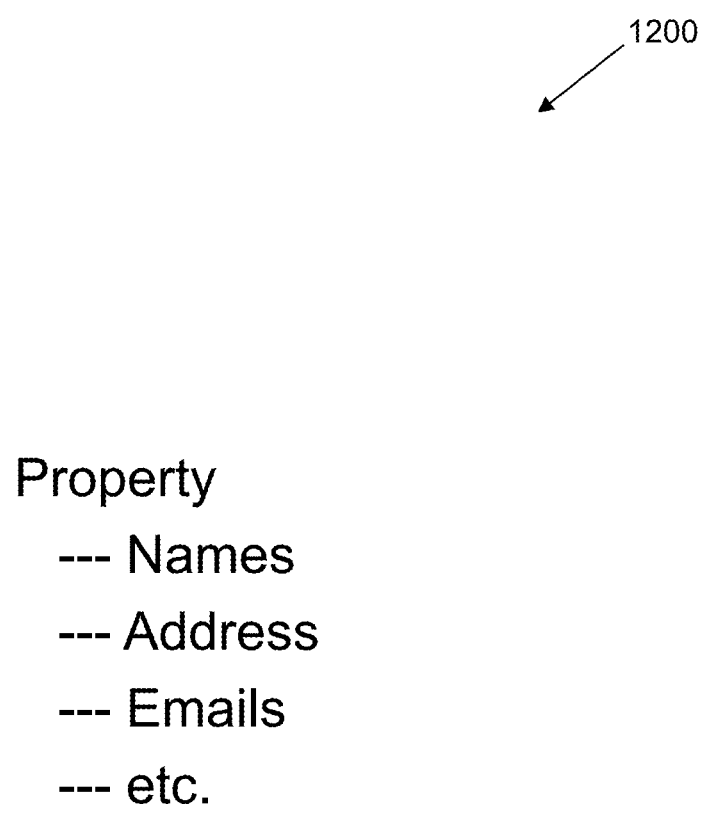

FIG. 12 is a diagram illustrating sample non-graph features for a property.

DETAILED DESCRIPTION OF THE INVENTION

Figure 1:
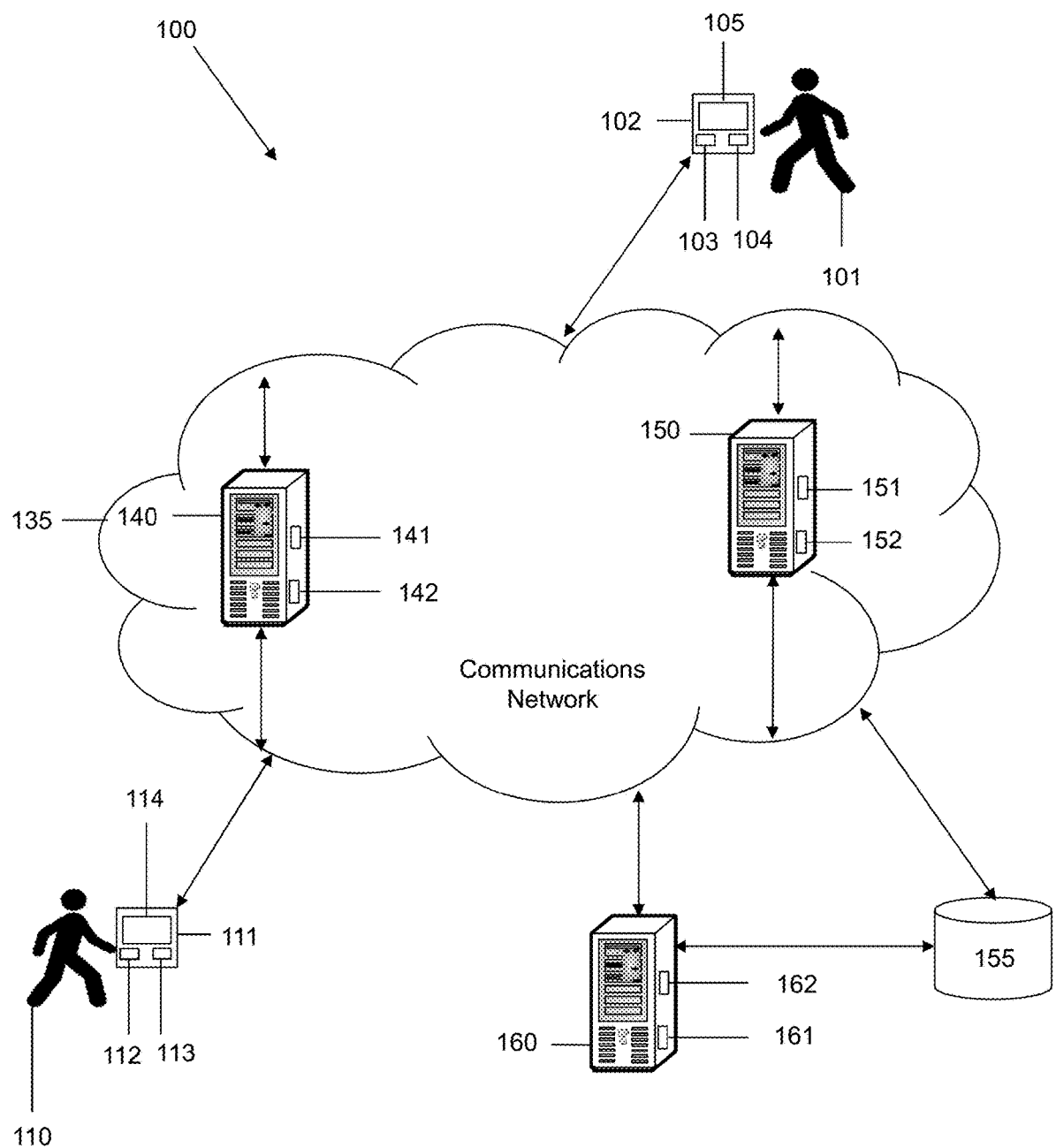
FIG. 1 is a schematic diagram of a system for discovering hidden correlation relationships for risk analysis using graph-based machine learning according to an embodiment of the present disclosure.

As shown in FIGS. 1-16, a system 100 for discovering hidden correlation relationships for risk analysis using graph-based machine learning is disclosed. The system 100 may be configured to support, but is not limited to supporting, artificial intelligence and machine learning services, data and content services, computing applications and services, cloud computing services, internet services, satellite services, telephone services, software as a service (SaaS) applications, mobile applications and services, and any other computing applications and services. The system may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may potentially desire to obtain a loan from a bank that the second user 110 is an employee of.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may be a computer, a laptop, a tablet device, a phablet, a server, a mobile device, a smartphone, a smart watch, a robot, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As indicated above, the second user 110 may be an employee of a bank that issues loans to individuals and entities. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, a robot, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include artificial intelligence-based applications, machine learning-based applications, applications for facilitating the completion of tasks, applications for originating loans and/or other banking products, cloud-based applications, search engine applications, natural language processing applications, database applications, algorithmic applications, phone-based applications, product-ordering applications, business applications, investment applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100.

In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140, and 150 may be utilized to perform the various operations and functions provided by the system 100, such as those requested by applications executing on the first and second user devices 102, 111. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160 or any combination thereof. In certain embodiments, the database 155 may store a record of any and all information obtained from any data sources utilized by the system 100 to facilitate the operative functions of the system 100 and its components, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store detected hidden correlations, store known correlations, store graphs generated by the system 100, store reduced graphs generated by the system 100, store features computed from the graphs, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, contact information, demographic information, psychographic information, work history information, education information, any attributes of the individual, any other information, or a combination thereof. Device profiles may include any type of information associated with a device, such as, but not limited to, operating system information, hardware specifications, information about each component of the device (e.g. sensors, processors, memories, batteries, etc.), attributes of the device, any other information, or a combination thereof. In certain embodiments, the database 155 may store artificial intelligence algorithms, machine learning algorithms, algorithms for performing any operations and/or calculations performed by the system 100, any type of algorithm, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom graphical user interface that the first user 101 or second user 110 may interact with by utilizing a web browser executing on the first user device 102 or second user device 111. In certain embodiments, the software application may execute directly as an installed program on the first and/or second user devices 102, 111, such as a mobile application or a desktop application.

The software application may include multiple programs and/or functions that execute within the software application and/or are accessible by the software application. For example, the software application may execute code to perform the operative functions, which assist in discovery hidden correlation relationships for risk analysis by utilizing graph-based machine learning. As another example, the software application may include an application that generates web content and pages that may be accessible to the first and/or second user devices 102, 111, any type of program, or any combination thereof. The application that generates web content and pages may be configured to generate a graphical user interface for the software application that is accessible and viewable by the first and second users 101, 110 when the software application is loaded and executed on the first and/or second computing devices 102, 111. The graphical user interface for the software application may display content for viewing by the first and/or second users 101, 110 via the first and/or second user devices 102, 111. Additionally, the graphical user interface may display functionality provided by the software application that enables the second user 110 and/or the second computing device 111 to interact with the software application and the modules supporting the software application's functionality.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, generating graphs based on collected data; reducing graphs, such as by removing edges from the graphs; computing the proximity between vertexes; computing graph features from graphs; determining non-graph features; training a machine learning model with features computing from the graphs; predicting and/or detecting whether a hidden correlation relationship exists between one or more pairs of vertexes (e.g. entities being monitored); and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 150, a server 160, and a database 155. However, the system 100 may include multiple first user devices 102, multiple second user devices 111, multiple communications networks 135, multiple servers 140, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Operatively and referring now also to FIGS. 2-14, the system 100 may be configured to discover hidden correlation relationships for risk analysis using graph-based machine learning, as is described herein and as shown in the following use-case scenario. Notably, the system 100 is not intended to be limited to the loan use-case scenario described herein, but may be utilized for detecting correlation relationships in any context and for any type of entities. In the banking use-case scenario, unveiled hidden correlation relationships impose a major risk for bank's lending operations. However, in many cases, it is often very difficult to sort out the hidden correlation relationships among a complicated network of connections of tens or even hundreds of companies and people related to a client. Notably, often these hidden relationships are designed in a way that makes outsiders like banks difficult to find. The system 100 provides functionality that discovers such hidden relationships by collecting data of known relationships into graph databases (e.g. database 155) and training a machine learning model using features computed from the graph database.

Figure 2:
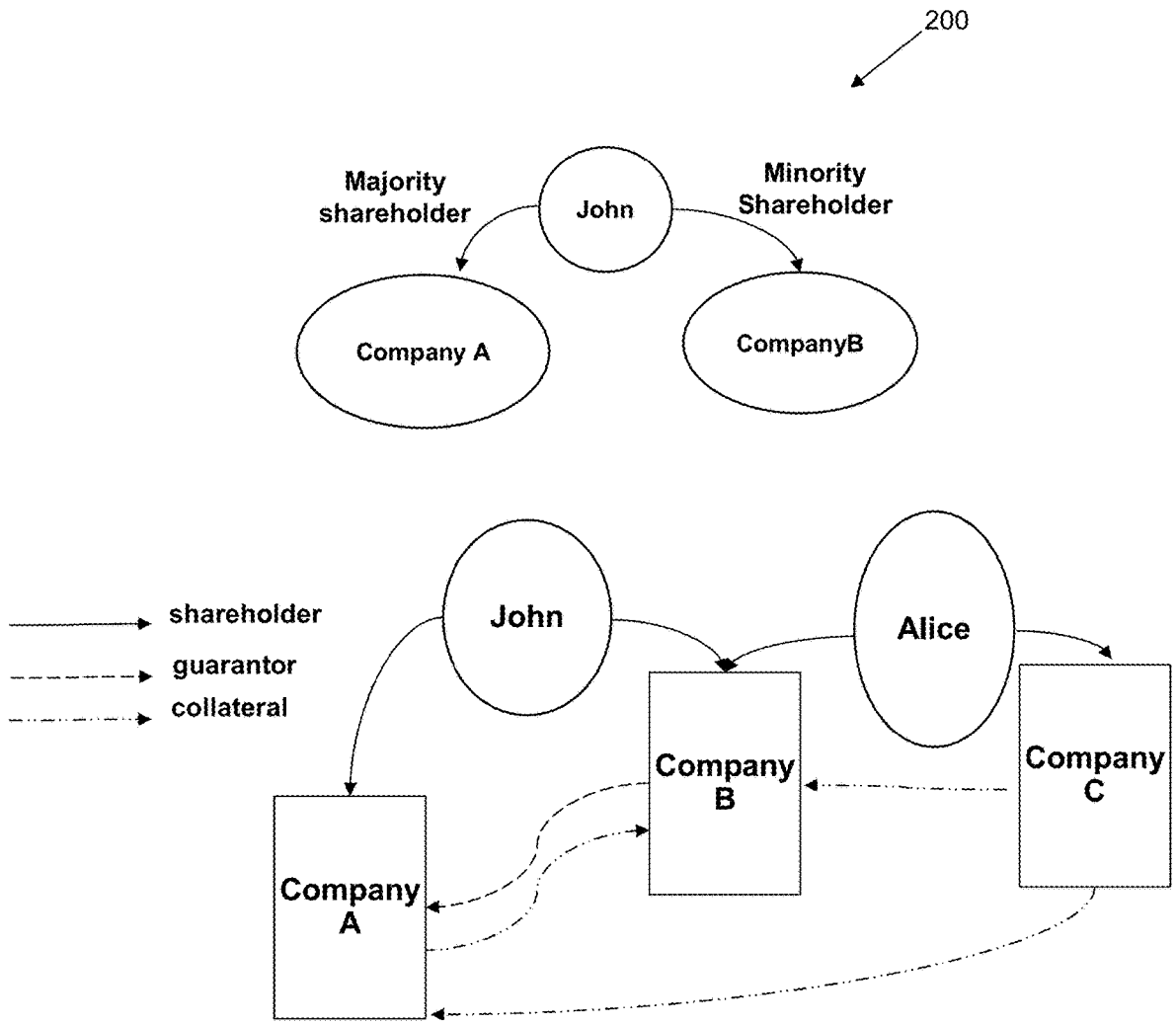
FIG. 2 depicts a first schematic diagram illustrating a simple graph showing the correlation relationship between an individual and two companies and a second schematic diagram showing multiple correlation relationships among two individuals and three companies. The second schematic diagram is a more complicated graph with multiple individuals/companies and multiple correlation relationships. There are five vertexes, i.e., persons John and Alice, Companies A, B and C. John is the shareholder of Companies A and B, while Alice is the shareholder of Companies B and C. Company B provides a guarantee to company A in a loan application. Companies A and C provide collateral to Company B in loan applications, while Company C provides collateral to company A in another loan application.
Figure 3:
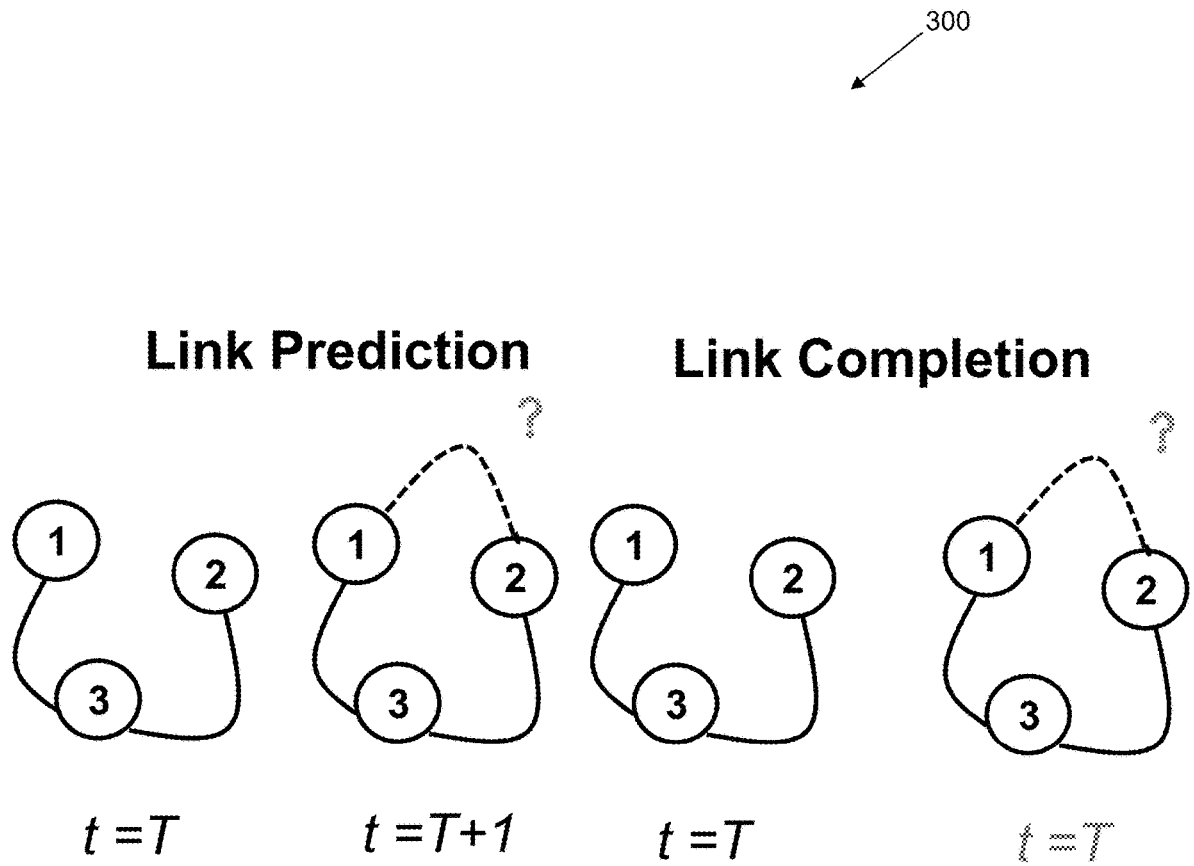
FIG. 3 is a schematic diagram illustrating steps for developing a solution to hidden relationship discovery including link prediction and link completion.
Figure 4:
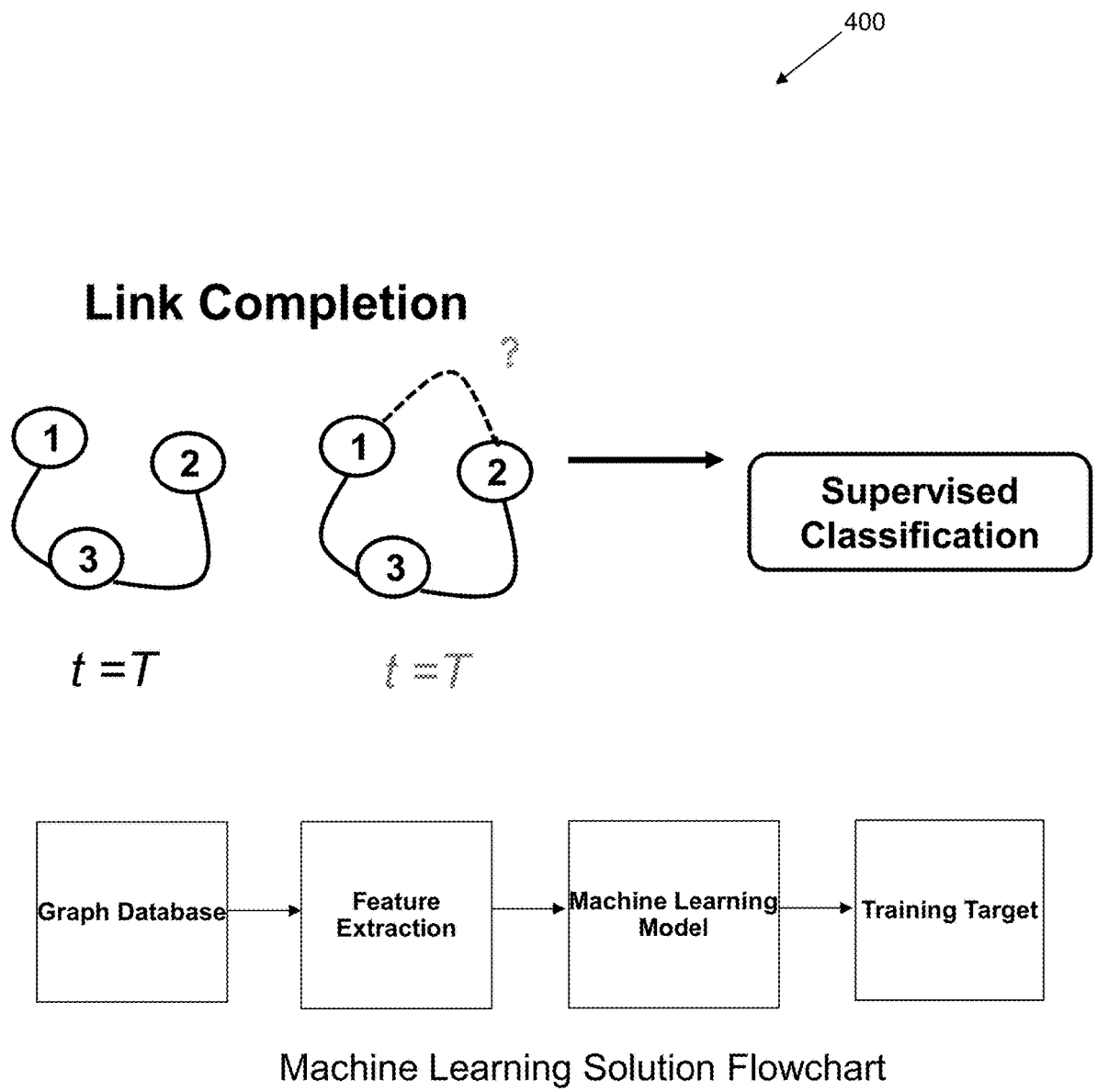
FIG. 4 is a schematic diagram illustrating a machine learning solution flow diagram for a training process for use with the system of FIG. 1. The flow chart diagram shows how a machine learning model is trained using features extracted from a graph database. For supervised classification learning and regression problems, a training target may be provided at the right end.
Figure 5:
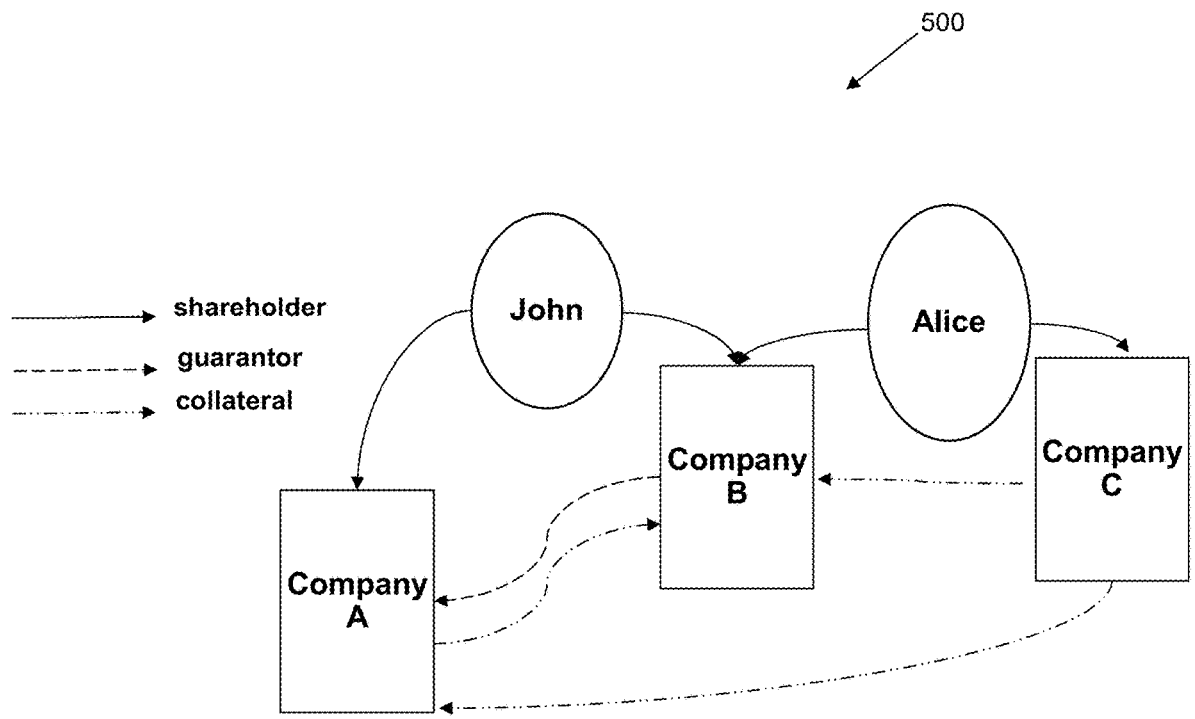
FIG. 5 is a schematic diagram illustrating known correlations for various companies and individuals in a specific use-case scenario to predict hidden correlation relationships.
Figure 6:
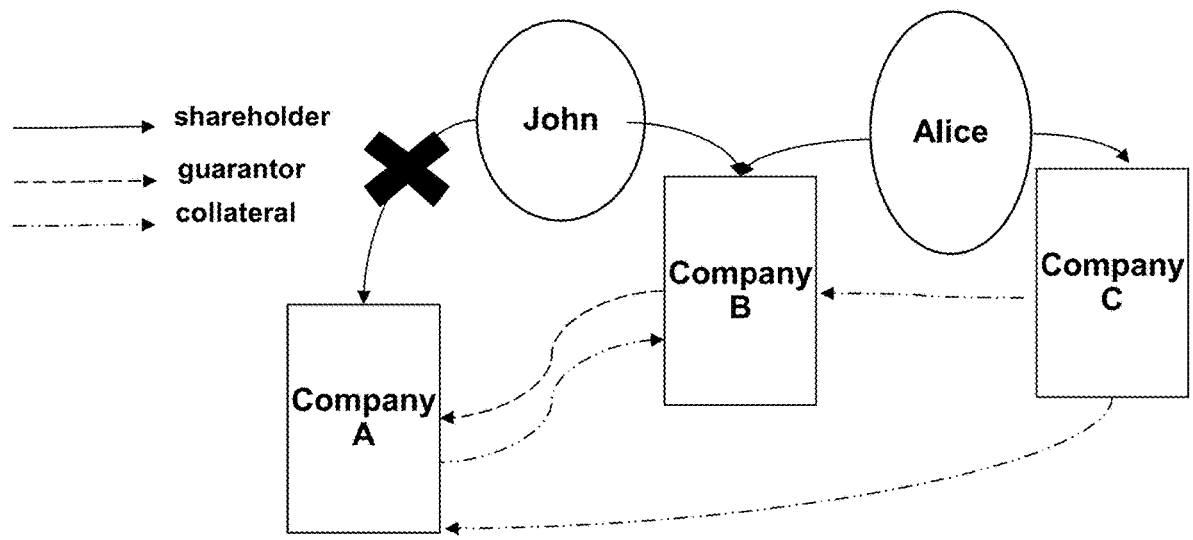
FIG. 6 is a schematic diagram illustrating a process for computing features from graphs that are utilized as training data for a model for use with the system of FIG. 1.
Figure 7:
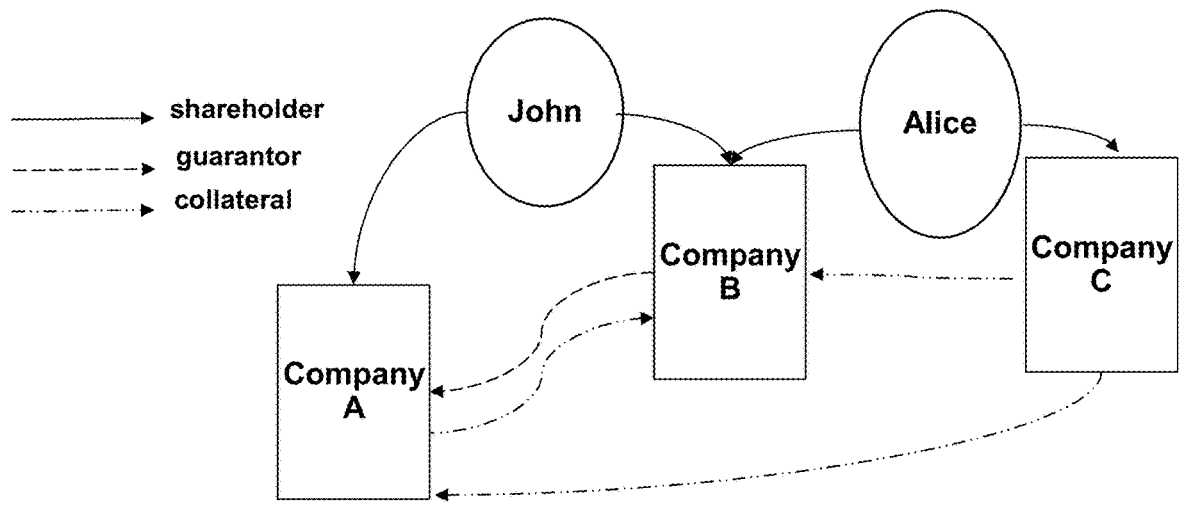
FIG. 7 is a schematic diagram illustrating further information associated with the process for computing features from graphs for use as training data for a model for use with the system of FIG. 1.

There are many sources that can provide data, such as, but not limited to banks, government agencies, news media and social networks, third-party agencies, among others. For each client, the bank's own record has a substantial amount of information relating to loan history, credit, finance, transactions, etc. about the client, and whether the client provides guarantees or collateral support to other clients or vice versa. Government agencies, such as the Securities Exchange Commission, may also have information about stock holding changes. Similarly, published reports made by journalistic investigators may reveal information about a company or individuals that are not known to banks previously. With all the data available, the system 100 may define a set of correlation relationships that are important in characterizing the overall financial and credit condition of clients. These relationships can include, but are not limited to shareholder, funding, guarantee, trading, personnel, collateral, transactions, other relationships, or any combination thereof. For each kind of relationship, the system 100 may define a degree of strength. For example, a strong shareholder relationship can be defined as an individual or a company that has more than 50% of the shares of the company under consideration. Similarly, a medium shareholder relationship can be defined as an individual or a company that has less than 50%, but more than 10% of the shares of the company. A weak shareholder relationship can be defined as an individual or a company has less than 10% of the shares of the company. One such example 200 is shown in FIG. 2 where John (e.g. first user 101) has a strong shareholder relationship with Company A.

The system 100 may then build a graph using the data, identified relationship, and the strength of the relationship. The graph may be and/or include a simple graph, a multigraph, or a combination thereof. The vertexes may be the companies or individuals that the system 100 is monitoring. The edge may indicate the correlation relationship defined above. The weight may be the strength of the relationship.

For each vertex or edge, there may be a set of properties. In this case, it may be called a property graph. For example, for a vertex that represents an individual person, the properties could include name, address, data of birth or data of founded, credit score, loan balance, etc. One example 200 is shown in FIG. 2 where John has a strong shareholder relationship with company A and has a weak shareholder relationship with company B. A graph may have tens of thousands of vertexes or any desired number of vertexes. In certain embodiments, the vertexes (i.e. vertices) may be and/or may represent a company, an important person of the company, any desired entity, or a combination thereof. A pair of vertexes can have multiple edges. In certain embodiments, the edges may represent an investment relationship, a shareholder relationship, a funding relationship, a transactions relationship, a guarantee relationship, a collateral relationship, a trading relationship, a very important person relationship, any kind of business relationship, any kind of relationship in general, or a combination thereof. For example, Company A and Company B can have guarantee relationship, but they can also have business transactions relationships. Such a graph database may be stored in computer hard disk drives or memories and/or in database 155.

The hidden relationship discovery may be solved by formulating it as a machine learning problem. The steps to implement the machine learning method and system are as follows. The system 100 may compute a set of features from the graph database that is used as data to train the machine learning model, which may be called ML-Data henceforward. In certain embodiments, the features may include network topology features, business-related features, any type of features, or a combination thereof. In certain embodiments, features may be node-pair wise metrics based on neighborhood, such as, but not limited to, common neighbors, Jaccard's coefficient, Adar Index, Salton Index, Leicht Index, Sorensen Index, Hub Index, resource allocation index, any other feature, or a combination thereof. In certain embodiments, the features may be node-pair wise metrics based on paths, such as, but not limited to, the shortest path distance, Katz distance, hitting time, the number of total paths, any type of path, or a combination thereof. In certain embodiments, the features may be computed from a subgraph containing two nodes of interest, such as the total vertexes and edges of the subgraph and the ratio of the number of edges over the nodes. In certain embodiments, features may be computed from circles that contain two vertexes and may be determined by the overlap of the two circles. In certain embodiments, the features may be computed from properties of the two vertexes, such as, but not limited to, the money transaction amount, the number of guarantees/collaterals provided for each other and the total amount of guarantees/collaterals, the overlap in their names, emails, addresses, other properties, or a combination thereof. See illustration 1200 of FIG. 12, for example. In certain embodiments, features may be computed for a single edge and/or for multiple edges. In certain embodiments, positive labels may be given to node-pairs where two nodes have a certain correlation relationship of interest, and negative labels may be given to node-pairs where the two nodes do not have a relationship of interest. In further embodiments, certain constraints may be added to limit the shortest distance between two negatively labeled nodes to a defined interval.

Figure 8:
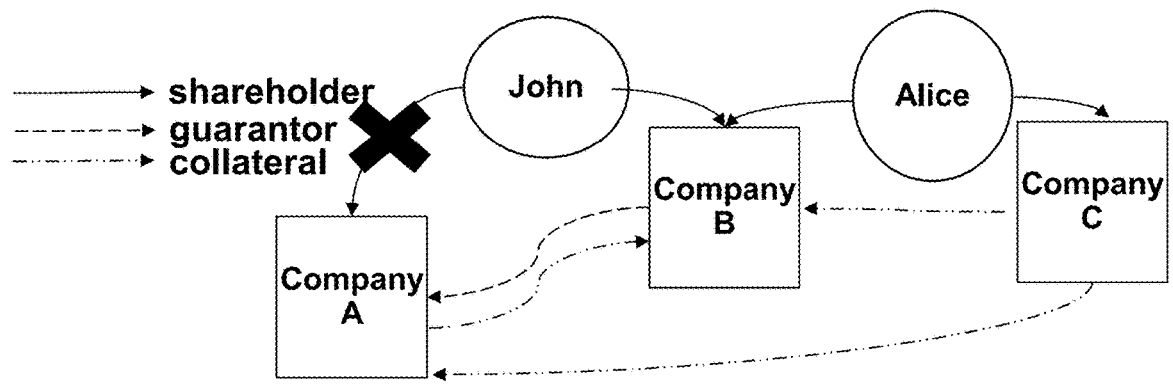
FIG. 8 is a schematic diagram illustrating a reduction of the graph presented in FIG. 7. The reduced graph is created by removing the edge between John and Company A. Features about John and Company A may be computed from this new reduced graph.
Figure 8:
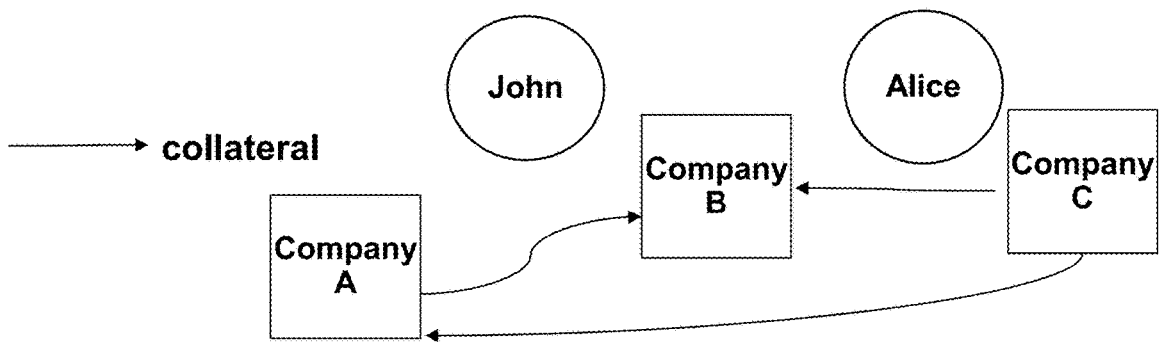
Figure 10:
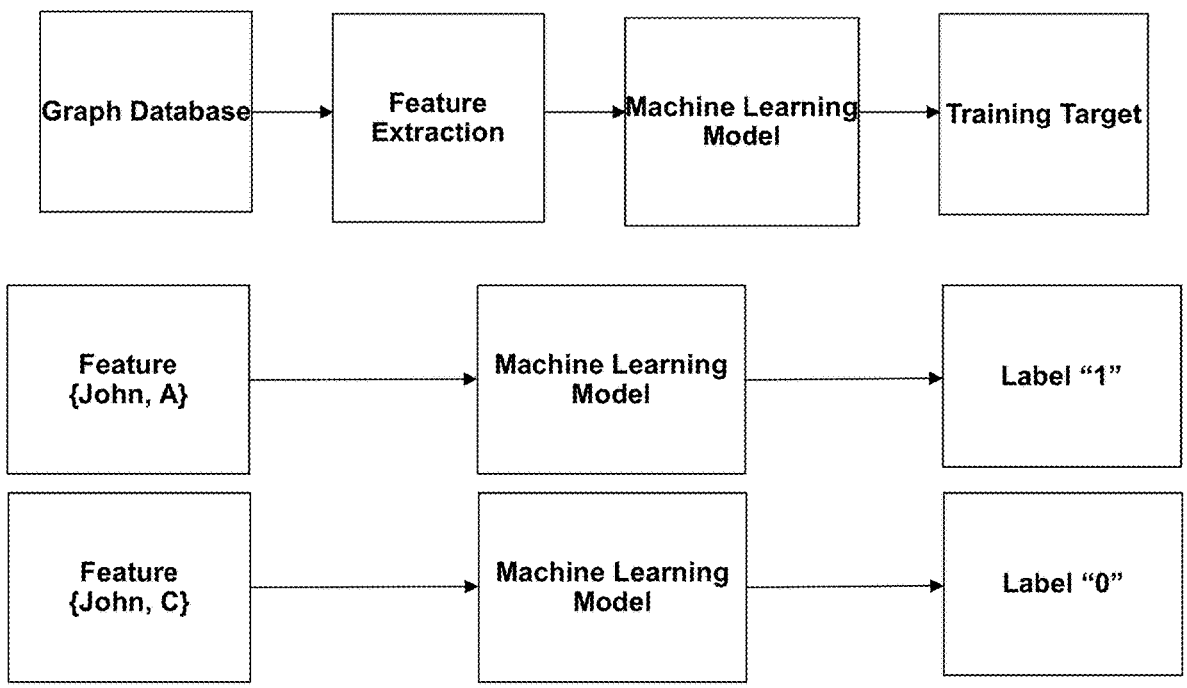
FIG. 10 is schematic diagram illustrating how graph features may be computed based on transformed graphs and used for a machine learning model.
Figure 11:
FIG. 11 is a schematic diagram illustrating sample graph features for use with the system of FIG. 1.

The first step for such a computation (i.e. computing a set of features from a graph) is for the system 100 to convert the original graph to a series of reduced graphs by removing the edge(s) that represents the kind of relationship between two vertexes that the second user 110, for example, wants to reveal. A major concept utilized for feature computation is a proximity measure that shows how close two vertexes are. For example, if one wants to discover if there is a hidden shareholder relationship between two vertexes, the feature set can be computed as follows. Taking the illustration 200 of FIG. 2 as an example, we want to measure how close John and Company A is where there is a shareholder edge between them, which the system 100 will use as an input to the machine learning model as a feature. See also diagram 500 of FIG. 5 regarding measuring the closeness between two vertexes. In order to do that, the system 100 first converts the original graph to a reduced graph by removing the shareholder edge connecting John and Company A. That is, the system 100 ends up with a graph as shown in the illustration 600 of FIG. 6 and/or at the bottom of the illustration 800 of FIG. 8. For this graph, we define a set of measures that characterize how close John and Company A are. As shown in the illustration 1100 of FIG. 11, these include, but are not limited to, the number of paths between them and the sum of the (weighted) path length, shortest distance, common neighbors, Jaccard's coefficient, resource allocation coefficient, Adamic Index, preferential attachment Index, Katz, hitting time, commute time, rooted PageRank, SimRank, Hub Index, Salton Index, Sorensen Index, etc. These metrics are all graphed-based metrics and can be computed based on the whole graph or a reduced graph as shown at the bottom of FIG. 8 or a subgraph of the reduced graph. For example, a subgraph can be defined as part of the original reduced graph that has edges where all or some of the edges represent the same correlation relationship or a combination of several correlation relationships. In certain embodiments, if this is a property graph, the subgraph can be defined as part of the original reduced graph where all or some of the edges represent the same property or a combination of several properties. Referring now also to illustration 900 of FIG. 9, in another embodiment, the subgraph could be the union of the (strongly) connected components, the cycles or the ego nets or the combination of them of the two vertexes under consideration. In certain embodiments, these (strongly) connected components, cycles or ego nets could be further reduced by specifying certain correlation relationships or properties only. In certain embodiments, the subgraph may be created by a community detection method, such as, but not limited to the Louvain method. In certain embodiments, some of the graph-based proximity metrics may be defined for simple graphs only where there is only one edge between any two vertexes. In order to compute these metrics for the multigraph where there are multiple edges, the graph may be converted to a simple graph. This may be done by converting multiple edges to one edge with or without a weight. In certain embodiments, when the weight does not take into account the number of edges, these metrics may be computed as usual. On the other hand, in certain embodiments, the weight may be set to reflect the impact of multiple edges. For example, suppose there are three edges between two vertexes A and B. Then for path-based metrics like shortest distance, the multiple edges between two vertexes can be combined as one edge with a weight of the inverse of the number of edges, e.g., ⅓ for this example. For neighborhood-based metrics like Common Neighbors, a different weight may be used. For example, vertex A has three edges with its neighbor vertex B, while vertex C has two edges with its neighbor B. The system 100 may first convert the multiple edges between A and B to one edge. Similar processing may be performed for C and B. See also illustration 700 of FIG. 7. The common neighbors between A and C is 1, i.e., vertex B. Then, the system 100 may multiply this number by the number of original multiple edges between A and B and between B and C, that is, the system 100 may multiply the common neighbors "1" by 3*2 and the system 100 determines that the final common neighbors 6. That is equivalent to give a weight of 3 to the new one single edge between A and B and a weight of 2 to the new one single edge between C and B. In certain embodiments, another set of features are metrics related to the node itself, such as, but not limited to, PageRank, in and out degrees, centralities, etc. In certain embodiments, a further set of features are related to the whole subgraph itself, such as, but not limited to, the total number of edges and nodes of the subgraph, and/or the ratio of the number of edges over the number of nodes.

Another set of features based on business/personnel relationship can be computed by the system 100. For example, if company A is a vertex of the subgraph created by the (strongly) connected components or cycles by John with one or more of the correlation relationship or vice versa. To be more specific, suppose John has a cycle consisted by vertexes who are connected by a guarantee relationship. Then, if company A is a vertex in this cycle, i.e., company A is part of the guarantee cycle of John, then the corresponding value for this feature would be "1". Otherwise the value for this feature is "0". A normalized version of this feature may be computed by dividing the feature value by the number of vertexes in this cycle except the vertexes pair under consideration. In certain embodiments, another type of cycle-related feature could be to find the cycles of the two nodes and count how many common nodes or edges shared by the cycles of the two nodes if the cycles are not the same. In certain embodiments, a normalized version can be calculated by dividing the number of overlap edges by the number of total edges. Another type of feature may be computed by determining if one vertex is on a certain path of the other vertex, e.g., if John is connected to Company A by a path with vertexes consisted by collateral correlation relationships or vice versa. If it is true, the feature value would be "1", otherwise, it would be "0". Furthermore, the system 100 can compute a normalized version of this. E.g., Suppose John is in the collateral path of Company A defined above then another feature may be computed by dividing it by the number vertexes that have a collateral path with Company A. Yet another consideration is for the system 100 to acquire the data and generate the graph database at different time points, e.g. to generate a graph database based on the information at each month. Then, the system 100 can generate features using the same procedure as above for each of these graphs. This is a way to achieve data augmentation, e.g., to expand the size of data available for machine learning. This is particularly useful for deep learning which often requires a lot of training data. A set of non-topology features may be computed based on the information for the vertexes and edges, which are often stored in properties for a property graph. For example, such features could include the name, address, email, etc. or the difference in name, address, email, etc., or if they are in the same industry/ geolocation for the companies or individuals, as shown in the illustration 1200 of FIG. 12. Other types of business related non-topology features may include the money transaction amount, the number of guarantees/collaterals provided for each other, the total amount of guarantees/collaterals of these two nodes within a certain amount of time, any other non-topology feature, or a combination thereof.

Figure 13:
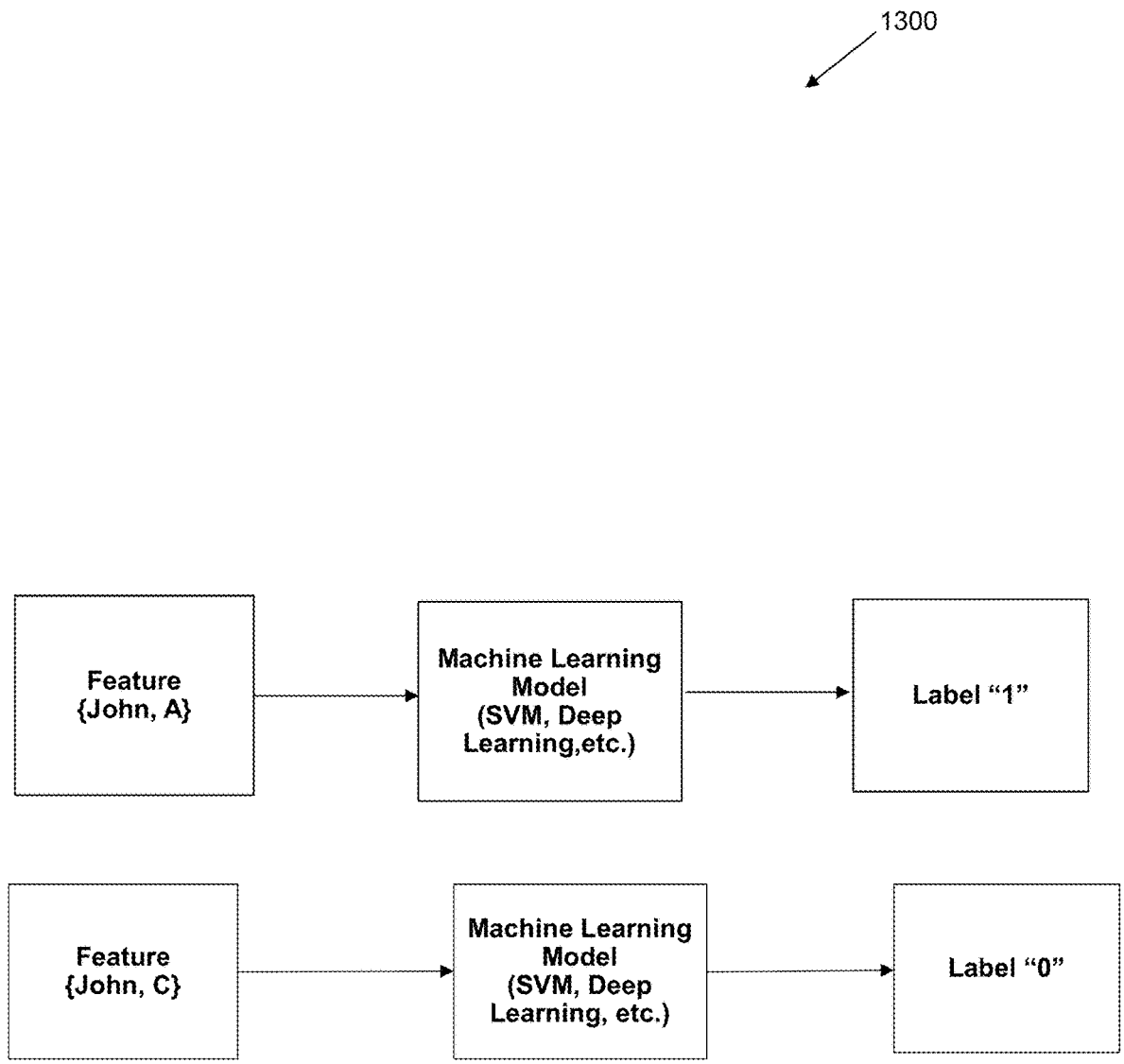
FIG. 13 is a schematic diagram illustrating training of a machine learning model by utilizing features computing from graphs.

A vector or matrix consisting of these features computed for John and Company A, as an example, is used as an input to the machine learning model. The corresponding target label on the right end of FIG. 4 and in illustration 1300 of FIG. 13 will be "1" as there is indeed a shareholder relationship between John and Company A. See also illustration 1000 of FIG. 10. Similarly, we can compute the same set of features for other pairs of vertexes where there is a shareholder edge connecting them, such as John and Company B, Alice and Company B, and Alice and Company C. For vertex pairs where there is no shareholder edge connecting them such as John and Company C, the system 100 may compute the same set of features in the original whole graph or a series of subgraphs of the original whole graph generated in the same way as the case when there is a shareholder relationship between two vertexes. But the corresponding target label for training target will be "0" in this instance, as shown in FIG. 13 and in FIG. 10. These pairs of features and the target label comprise the ML-Data. A pair in the ML-Data set may be composed by a set of features computed from two vertexes and a corresponding target label, e.g., 1 and 0 for a supervised binary classification. Therefore, the hidden relationship discovery problem may be converted to a supervised binary classification problem. The system 100 may then proceed to determining if there is a hidden relationship between Alice and Company A and/or any of the other companies, as is shown in illustration 1400 of FIG. 14.

Figure 14:
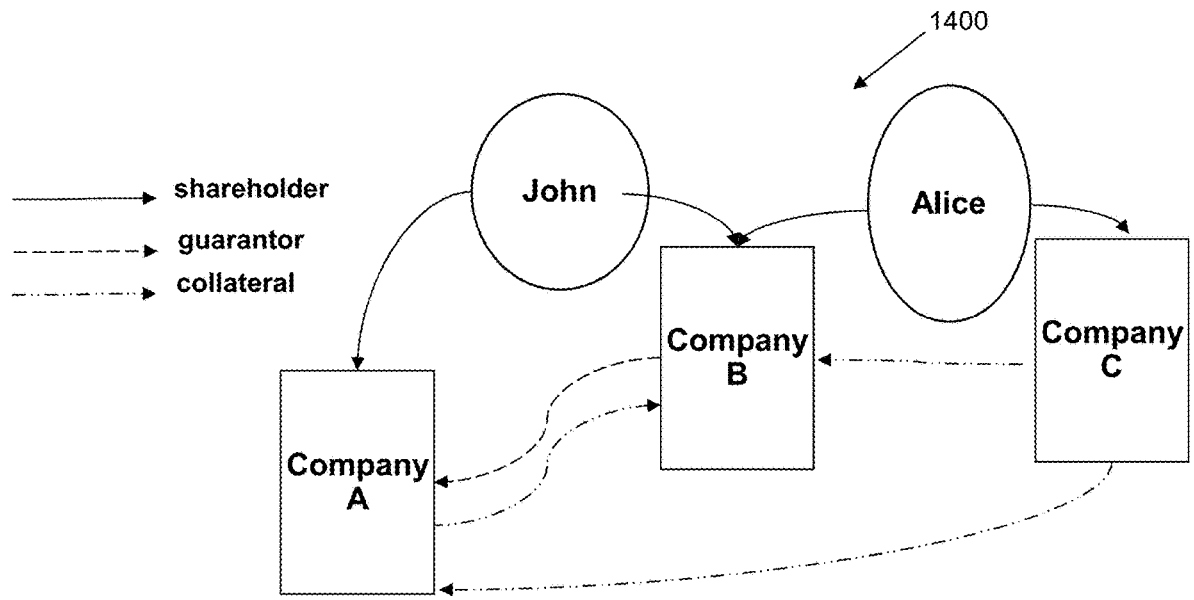
FIG. 14 is a schematic diagram illustrating a prediction made by the machine learning model with regard to a hidden correlation relationship in a sample use case scenario.
Figure 14:
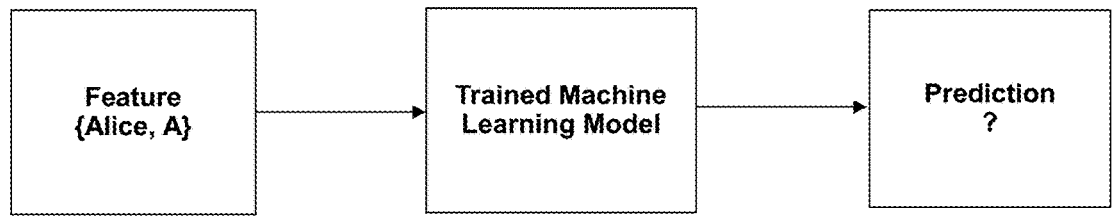
Figure 14:
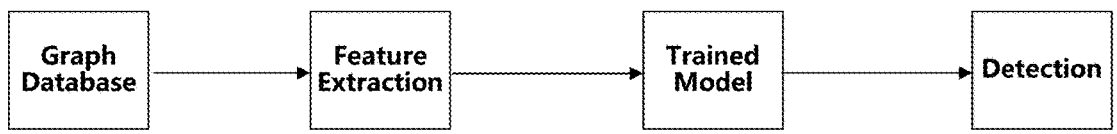

After the system 100 has the ML-Data consisting of the pairs of features and corresponding target labels, the system 100 may enter the phase of the training process to build machine learning model. This is shown in the illustration 1300 of FIG. 13, for example. Usually before the training, the system 100 may split the ML-Data set into three parts: training data set, validation data set and test data set. The test data set could also be computed from completely new data which has not been used in the computation of ML-Data mentioned above, e.g. from incoming new clients. The training data set may be used to train the model, while the validation data set may be used to evaluate and optimize the generalization performance of the model. For each iteration step, one or more pairs of ML-data may be used as inputs in the model. Supervised training algorithms may include, but are not limited to, logistic regression, SVM, random forest, gradient boosting decision trees or deep neural network (deep learning). The training process may stop when its performance on validation data is satisfactory. The trained machine learning model may be used to predict if there is a hidden relationship between a pair of two vertexes. The graph goes through the same feature computation process, which provides a set of features defined the same as those for training. The features may be fed to the trained machine learning model and the output of the machine learning model may detect the hidden correlation relationship. The output could be a binary output, e.g., 0 for no hidden relationship and 1 for the existence of a hidden relationship, or a probability, which represents the likelihood of the existence of a hidden relationship. An example 1400 is shown in FIG. 14.

Figure 15:
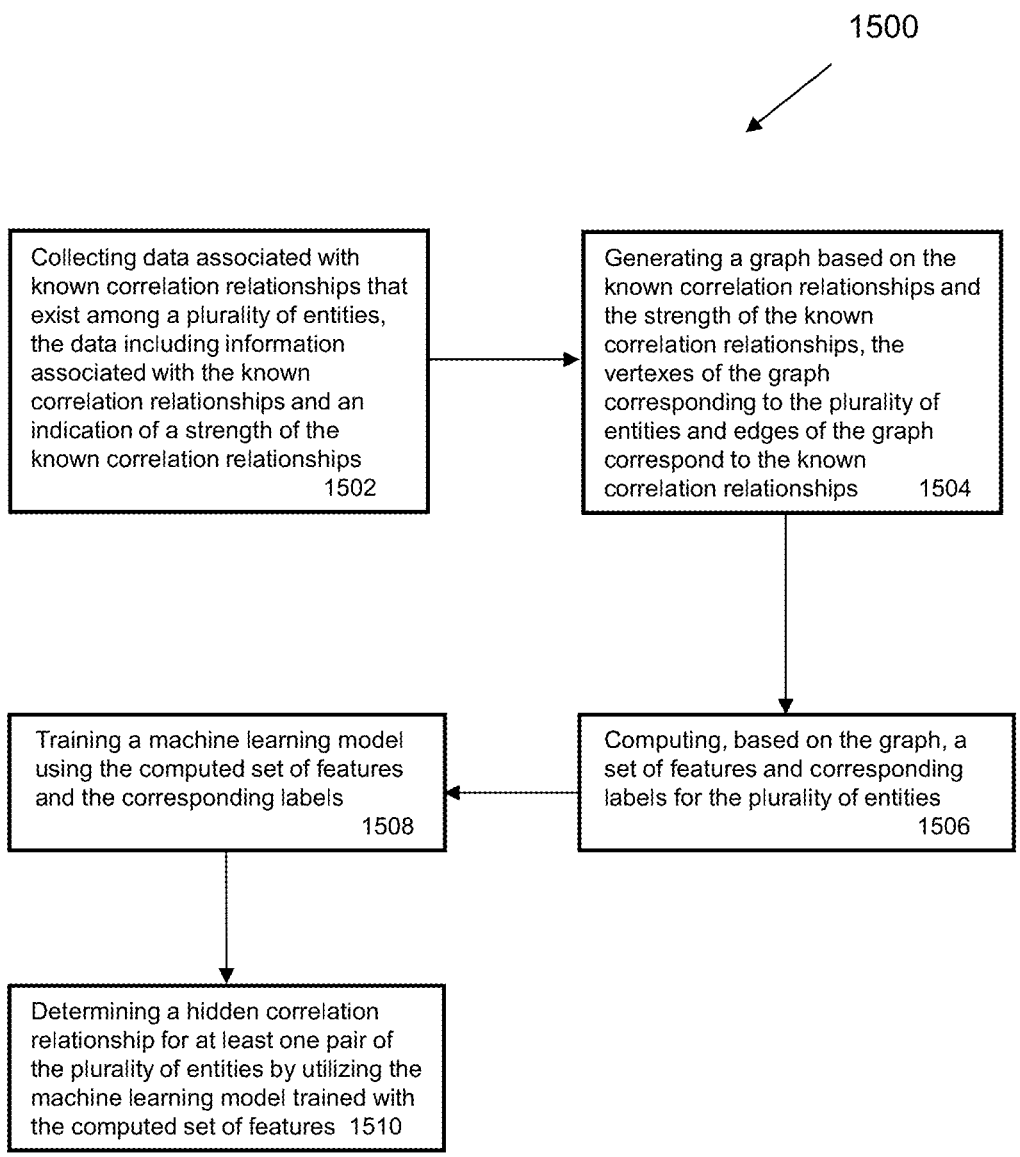
FIG. 15 is a flow diagram illustrating a sample method for discovering hidden correlation relationships for risk analysis using graph-based machine learning according to an embodiment of the present disclosure.

As shown in FIG. 15, an exemplary method 1500 for discovering hidden correlation relationships for risk analysis using graph-based machine learning is schematically illustrated. The method 1500 may begin at step 1502, which may include collecting data associated with known correlation relationships that exist amount of a plurality of entities. In certain embodiments, the data may include information associated with the known correlation relationships and an indication of a strength of the known correlation relationships. In certain embodiments, the collecting may be performed and/or facilitated by utilizing the first user device 102, the second user device 111, the servers 140, 150, 160, the database 155, the communications network 135, any combination thereof, or by utilizing any other appropriate program, network, system, component, and/or device. As step 1504, the method 1500 may include generating a graph based on the known correlation relationships and the strength of the known correlation relationships. In certain embodiments, the vertexes (i.e. vertices) of the graph may correspond to the plurality of entities and the edges of the graph may correspond to the known correlation relationships. In certain embodiments, the generating may be performed and/or facilitated by utilizing the first user device 102, the second user device 111, the servers 140, 150, 160, the database 155, the communications network 135, any combination thereof, or by utilizing any other appropriate program, network, system, component, and/or device.

At step 1506, the method 1500 may include computing, based on the generated graph, a set of features and/or corresponding labels for the plurality of entities. The computing of the features and/or corresponding labels may be performed and/or facilitated by utilizing the first user device 102, the second user device 111, the servers 140, 150, 160, the database 155, the communications network 135, any combination thereof, or by utilizing any other appropriate program, network, system, component, and/or device. Once the set of features and/or corresponding labels of the plurality of entities are computed, the method 1500 may proceed to step 1508, which may include training a machine learning model using the computed set of features and the corresponding labels. In certain embodiments, the training may be performed and/or facilitated by utilizing the first user device 102, the second user device 111, the servers 140, 150, 160, the database 155, the communications network 135, any combination thereof, or by utilizing any other appropriate program, network, system, component, and/or device. The method 1500 may proceed to step 1510, which may include determining a hidden correlation relationship for at least one pair of the plurality of entities by utilizing the machine learning model trained with the computed set of features and/or labels. In certain embodiments, the determining of the hidden correlation relationship may be performed and/or facilitated by utilizing the first user device 102, the second user device 111, the servers 140, 150, 160, the database 155, the communications network 135, any combination thereof, or by utilizing any other appropriate program, network, system, component, and/or device.

The systems and methods may include further functionality and features. For example, the system 100 may generate a series of graphs for different time points and, as a result, features may be computed for the graphs at each time point. In certain embodiments, the machine learning models of the system 100 may be trained by applying support vector machine (SVM), deep neural networks, gradient boosting, decision trees, random forests, logistic regressions, any other training technique, or a combination thereof. In certain embodiments, the machine learning model may be trained in a supervised, semi-supervised, and/or unsupervised manner. In further embodiments, the system 100 and methods disclosed herein may be utilized to find hidden relationships among two or more entities in anti-money laundering, anti-terrorist, and/or other law enforcement investigations. As shown in the diagrams 300 and 400 of FIGS. 3 and 4, the system 100 may be configured to support link prediction and/or completion. In doing so, the system 100 may utilize a plurality of steps to discovering hidden relationships. The steps may include converting it to a machine learning problem, creating training data sets from existing data and/or graph databases, and conducting feature engineering.

The systems and methods disclosed herein may include still further functionality and features. For example, the operative functions of the system 100 and method may be configured to execute on a special-purpose processor specifically configured to carry out the operations provided by the system 100 and method. Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. In certain embodiments, the system 100 and methods may also provide effective computing resource management by utilizing the features and functions described in the present disclosure. For example, in certain embodiments, while performing certain actions the system 100 may specify a quantity of computer processor resources (e.g. processor clock cycles, processor speed, processor cache, etc.) that may be dedicated to computing the features from the graphs, reducing the graphs, predicting and/or detecting the hidden correlation relationships, and performing any other operations conducted by the system 100, or any combination thereof. For example, the system 100 or an application of the system 100 may indicate a quantity of processor cycles of a processor that may be utilized to obtain data, process obtained data, and/or specify a selected amount of processing power that may be dedicated to performing actions conducted by the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. Notably, the signals transmitted to the processors and memories may be utilized to optimize the usage of computing resources while executing the operations conducted by the system 100. As a result, such features provide substantial operational efficiencies and improvements over existing technologies.

Figure 16:
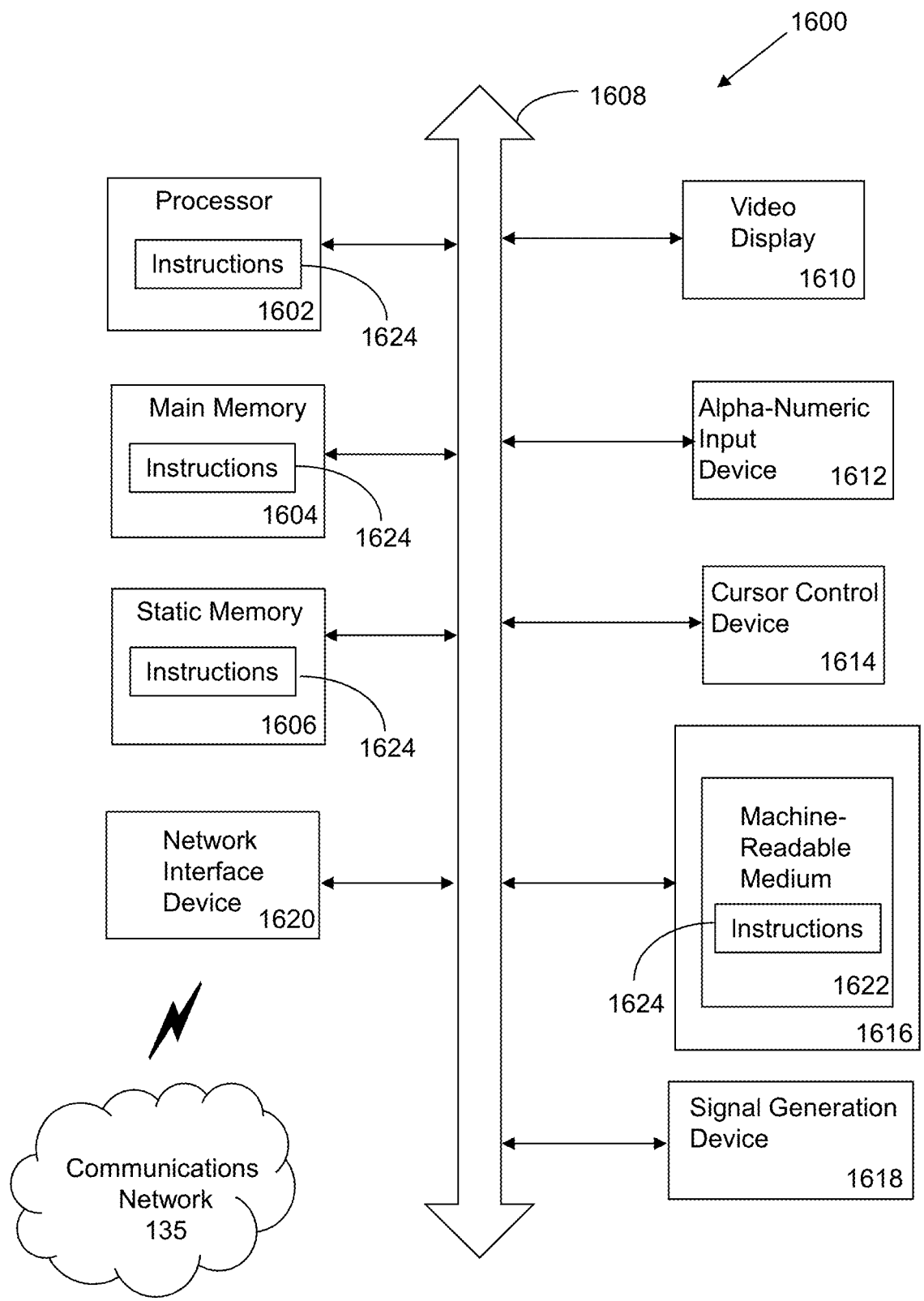
FIG. 16 is a schematic diagram of a machine in the form of a computer system within which a set of instructions, when executed, may cause the machine to perform any one or more of the methodologies or operations of the systems and methods for discovering hidden correlation relationships for risk analysis using graph-based machine learning.

Referring now also to FIG. 16, at least a portion of the methodologies and techniques described with respect to the exemplary embodiments of the system 100 can incorporate a machine, such as, but not limited to, computer system 1600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 150, the database 155, the server 160, or any combination thereof. In certain embodiments, the machine may assist with operations performed by any programs in the system. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610, which may be, but is not limited to, a liquid crystal display (LCD), a flat panel, a solid state display, or a cathode ray tube (CRT). The computer system 1600 may include an input device 1612, such as, but not limited to, a keyboard, a cursor control device 1614, such as, but not limited to, a mouse, a disk drive unit 1616, a signal generation device 1618, such as, but not limited to, a speaker or remote control, and a network interface device 1620.

The disk drive unit 1616 may include a machine-readable medium 1622 on which is stored one or more sets of instructions 1624, such as, but not limited to, software embodying any one or more of the methodologies or functions described herein, including those methods illustrated above. The instructions 1624 may also reside, completely or at least partially, within the main memory 1604, the static memory 1606, or within the processor 1602, or a combination thereof, during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1622 containing instructions 1624 so that a device connected to the communications network 135, another network, or a combination thereof, can send or receive voice, video or data, and communicate over the communications network 135, another network, or a combination thereof, using the instructions. The instructions 1624 may further be transmitted or received over the communications network 135, another network, or a combination thereof, via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions; and
   a processor that executes the instructions to perform operations, the operations comprising:
      collecting data associated with known correlation relationships that exist among a plurality of entities;
      accessing the data associated with the known correlation relationships that exist among a plurality of entities, wherein the data comprises information associated with the known correlation relationships and an indication of a strength of the known correlation relationships;
      generating a graph based on the known correlation relationships and the strength of the known correlation relationships, wherein vertexes of the graph correspond to the plurality of entities and edges of the graph correspond to the known correlation relationships;
      computing, based on the graph, a set of features and corresponding labels for the plurality of entities, wherein the set of features and the corresponding labels are computed based on converting the graph to a reduced graph by removing an edge of the edges of the graph representing a type of relationship between a pair of vertexes of the vertexes that is sought to be revealed from being hidden, wherein at least one feature of the set of features is computed by utilizing a proximity measure indicating a measure of how close each vertex of the pair of vertexes are to each other, wherein the proximity measure indicates a number of paths between the pair of vertexes and a sum of a weighted path length;
      training a machine learning model using the computed set of features and the corresponding labels; and
      determining a hidden correlation relationship between a first entity of the plurality of entities and at least one additional entity of the plurality of entities by utilizing the machine learning model trained with the computed set of features, wherein the hidden correlation relationship is displayed to a user on a first user device to assist the user in making a decision regarding the first entity.

2. The system of claim 1, wherein the graph comprises a simple graph, a multi-graph, or a combination thereof.

3. The system of claim 1, wherein the vertexes of the graph comprise a company, an important person of the company, or a combination thereof.

4. The system of claim 1, wherein the edges represent an investment relationship, a shareholder relationship, a funding relationship, a transactions relationship, a guarantee relationship, a collateral relationship, a trading relationship, a very important person (VIP) relationship, any type of relationship, any type of business relationship, or a combination thereof.

5. The system of claim 1, wherein the features of the set of features include network topology features and business-related features.

6. The system of claim 1, wherein the features of the set of features are based on neighborhood and comprise node-pair wise metrics comprising common neighbors, Jaccard's coefficient, Adar Index, Salton Index, Leicht Index, Sorensen Index, Hub Index, Resource Allocation Index, or a combination thereof.

7. The system of claim 1, wherein features of the set of features comprise node-pair wise metrics based on paths including a shortest path distance, a Katz distance, a hitting time, a number of total paths, or a combination thereof.

8. The system of claim 1, wherein the features of the set of features are computed from one or more of:
   a subgraph containing two nodes of interest, including the total vertexes and edges of the subgraph and the ratio of the number of edges over the nodes;
   circles that contain two vertexes of the vertexes and are determined by an overlap of the circles; or
   properties of the vertexes, wherein the properties comprise a money transaction amount, a number of guarantees provided for each other, a number of collaterals provided for each other, a total amount of the guarantees, a total amount of the collaterals, an overlap in names, emails, addresses, or a combination thereof.

9. The system of claim 1, wherein the features of the set of features are computed for a single edge of the edges and multiple edges of the edges.

10. The system of claim 1, wherein the operations further comprise:
    providing positive labels to node-pairs where two nodes have a certain correlation relationship of interest; and
    providing negative labels to node-pairs where the two nodes do not have the correlation relationship of interest.

11. The system of claim 10, wherein the operations further comprise:
    generating a series of graphs for different time points; and
    computing additional features for the graph at each of the different time points.

12. The system of claim 1, wherein the third-party data sources include information provided by government agencies, news media, social networks, third-party agencies, public announcements made by the plurality of entities, or a combination thereof.

13. The system of claim 1, wherein the data includes loan histories, credit histories, financial information, trading and economic information, shareholder information, and transactional information.

14. A method, comprising:
    accessing data associated with known correlation relationships that exist among a plurality of entities, wherein the data comprises information associated with the known correlation relationships and an indication of a strength of the known correlation relationships;
    generating a graph based on the known correlation relationships and the strength of the known correlation relationships, wherein vertexes of the graph correspond to the plurality of entities and edges of the graph correspond to the known correlation relationships;

computing, based on the graph, a set of features and corresponding labels for the plurality of entities, wherein the set of features and the corresponding labels are computed based on converting the graph to a reduced graph by removing an edge of the edges of the graph representing a type of relationship between a pair of vertexes of the vertexes that is sought to be revealed from being hidden, wherein at least one feature of the set of features is computed by utilizing a proximity measure indicating a measure of how close each vertex of the pair of vertexes are to each other, wherein the proximity measure indicates a number of paths between the pair of vertexes and a sum of a weighted path length;

training a machine learning model using the computed set of features and the corresponding labels;

determining, by utilizing instructions from a memory that are executed by a processor, a hidden correlation relationship between a first entity of the plurality of entities and at least one additional entity of the plurality of entities by utilizing the machine learning model trained with the computed set of features; and displaying, on a user device, the hidden relationship to a user using the user device to assist the user in making a decision regarding the first entity.

15. The method of claim 14, further comprising training the machine learning model by utilizing support vector machines, deep neural networks, gradient boosting, decision trees, random forests, logistic regression, or a combination thereof.

16. The method of claim 14, further comprising training the machine learning model in a supervised, semi-supervised, or unsupervised manner.

17. The method of claim 14, further comprising determining an additional hidden correlation relationship among two or more entities of the plurality of entities for anti-money laundering, anti-terrorist, or other law enforcement investigations.

18. The method of claim 14, further comprising:
providing positive labels to node-pairs where two nodes have a certain correlation relationship of interest; and
providing negative labels to node-pairs where the two nodes do not have the correlation relationship of interest.

19. The method of claim 14, further comprising:
generating a series of graphs for different time points; and
computing additional features for the graph at each of the different time points.

20. A non-transitory computer-readable device comprising instructions, which when loaded and executed by a processor, cause the processor to perform operations comprising:

receiving data associated with known correlation relationships that exist among a plurality of entities, wherein the data comprises information associated with the known correlation relationships and an indication of a strength of the known correlation relationships;

generating a graph based on the known correlation relationships and the strength of the known correlation relationships, wherein vertexes of the graph correspond to the plurality of entities and edges of the graph correspond to the known correlation relationships;

computing, based on the graph, a set of features and corresponding labels for the plurality of entities, wherein the set of features and the corresponding labels are computed based on converting the graph to a reduced graph by removing an edge of the edges of the graph representing a type of relationship between a pair of vertexes of the vertexes that is sought to be revealed from being hidden, wherein at least one feature of the set of features is computed by utilizing a proximity measure indicating a measure of how close each vertex of the pair of vertexes are to each other, wherein the proximity measure indicates a number of paths between the pair of vertexes and a sum of a weighted path length;

training a machine learning model using the computed set of features and the corresponding labels;

determining a hidden correlation relationship between a first entity of the plurality of entities and at least one additional entity of the plurality of entities by utilizing the machine learning model trained with the computed set of features; and displaying, on a user device, the hidden correlation relationship to a user using the user device to assist the user in making a decision regarding the first entity.

* * * * *